(12) United States Patent
Ananthanarayanan et al.

(10) Patent No.: US 9,421,869 B1
(45) Date of Patent: Aug. 23, 2016

(54) DEPLOYMENT AND ADJUSTMENT OF AIRBORNE UNMANNED AERIAL VEHICLES

(71) Applicant: Amazon Technologies, Inc., Seattle, WA (US)

(72) Inventors: Peruvemba Ranganathan Sai Ananthanarayanan, Sunnyvale, CA (US); Anuj Dron, San Jose, CA (US); Adrian Napoles, Cupertino, CA (US); Rohit Sammeta, Sunnyvale, CA (US); Ming Zheng, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/866,761

(22) Filed: Sep. 25, 2015

(51) Int. Cl.
| G06F 7/70 | (2006.01) |
| B60L 5/00 | (2006.01) |
| B64D 5/00 | (2006.01) |
| B64D 39/00 | (2006.01) |
| G05D 1/10 | (2006.01) |
| G05D 1/00 | (2006.01) |
| B64D 41/00 | (2006.01) |

(52) U.S. Cl.
CPC . B60L 5/005 (2013.01); B64D 5/00 (2013.01); B64D 39/00 (2013.01); G05D 1/0094 (2013.01); G05D 1/101 (2013.01); *B64C 2201/042* (2013.01); *B64C 2201/066* (2013.01); *B64C 2201/12* (2013.01); *B64C 2201/141* (2013.01); *B64D 2041/005* (2013.01); *B64D 2221/00* (2013.01)

(58) Field of Classification Search
USPC .......................................................... 701/14
See application file for complete search history.

(56) References Cited

U.S. PATENT DOCUMENTS

| 9,083,425 | B1 * | 7/2015 | Frolov | H04B 7/18504 |
| 9,139,310 | B1 * | 9/2015 | Wang | B64F 1/36 |
| 2014/0208371 | A1 * | 7/2014 | Mori | H04N 21/41422 725/77 |
| 2014/0319272 | A1 * | 10/2014 | Casado Magana | B64F 1/04 244/110 E |
| 2015/0336668 | A1 * | 11/2015 | Pasko | B64C 39/024 701/2 |
| 2015/0336669 | A1 * | 11/2015 | Kantor | G01C 21/3415 701/3 |
| 2015/0336671 | A1 * | 11/2015 | Winn | B64C 39/024 701/3 |
| 2015/0339933 | A1 * | 11/2015 | Batla | G08G 5/0069 701/120 |
| 2015/0379874 | A1 * | 12/2015 | Ubhi | G01S 5/0027 701/3 |
| 2016/0001883 | A1 * | 1/2016 | Sanz | B64C 39/024 244/17.23 |
| 2016/0046387 | A1 * | 2/2016 | Frolov | G08G 5/0095 244/59 |
| 2016/0050011 | A1 * | 2/2016 | Frolov | H04B 7/18506 455/431 |
| 2016/0050012 | A1 * | 2/2016 | Frolov | H04B 7/18506 455/431 |

\* cited by examiner

Primary Examiner — Hussein A. Elchanti
(74) Attorney, Agent, or Firm — Athorus, PLLC

(57) ABSTRACT

This disclosure describes a power unmanned aerial vehicle (UAV) that may generate a current from a magnetic field of an overhead power line. In various implementations, while the power UAV is flying, the power UAV may receive another UAV at a platform. A control element of the power UAV may generate signals to cause the power UAV to fly to a location of a conductor of the power line. The control element may also determine a position of the secondary coil with respect to the power line and generate control signals to adjust the position of the secondary coil based on the determined position of the secondary coil, a determined safety distance, and/or a determined threshold distance for efficient current generation. A shielding substrate may also be provided to shield electronics of the power UAV or other UAVs from magnetic fields.

20 Claims, 9 Drawing Sheets

DEPLOYMENT AND ADJUSTMENT OF AIRBORNE UNMANNED AERIAL VEHICLES

BACKGROUND

Unmanned aerial vehicles (UAVs) that are electrically powered are continuing to increase in use. While there are many benefits to electrically powered UAVs, there are drawbacks. In particular, the range that an electrically powered UAV can travel before recharging is limited and recharging the electrically powered UAV is time consuming. As an alternative to recharging, the power supply (e.g., battery) of an electrically power UAV may be replaced so the UAV can quickly resume flight. However, even in these instances the range of the UAV is limited to the extent that it must land so that the power supply can be replaced.

BRIEF DESCRIPTION OF THE DRAWINGS

The detailed description is described referring to the accompanying figures. In the figures, the left-most digit(s) of a reference number identifies the figure in which the reference number first appears. Using the same reference numbers in different figures indicates similar or identical components or features.

Figure 1:
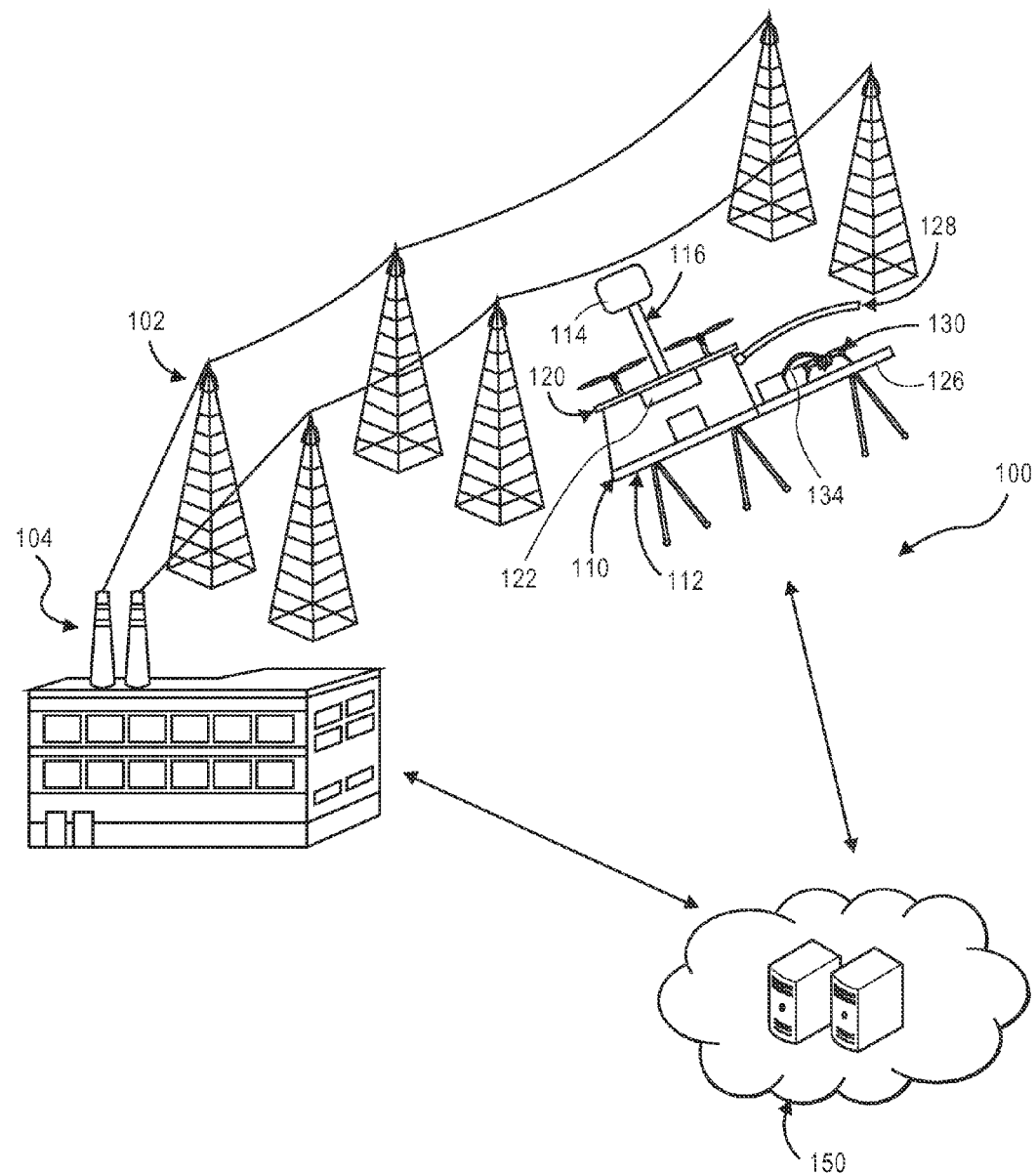
FIG. 1 depicts a block diagram of an environment in which a power UAV may charge other UAVs during flight, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

Furthermore, the disjunctive term "or", as used herein and throughout the claims that follow, is intended to mean "and/or", having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also as used in the description herein and throughout the claims that follow, the meaning of "in" includes "in" and "on" unless the context clearly dictates otherwise.

DETAILED DESCRIPTION

This disclosure describes flying "power UAVs" that generate current from electromagnetic fields emanating from one or more conductors of overhead power lines. Related methods and control routines for power UAVs are also described. On average, about 30% of power is lost from the transfer of power from a power generator to an end-user. The implementations described herein may utilize the otherwise lost power. Power UAVs use one or more secondary transformers or secondary coils that utilize magnetic fields emanating from overhead power lines to generate current that may be used for recharging other UAVs. Other UAVs are generally referred to herein as rechargeable UAVs or recharging UAVs.

The current generated by power UAVs can be used in many ways. The current may operate or fly the power UAV, stored in an energy storage device of the power UAV, or provided to one or more rechargeable UAVs. The power UAV may have a landing pad, platform, or other structure for receiving rechargeable UAVs. Rechargeable UAVs may land on the platform while the power UAV is flying and receive a charging current from the power UAV to replenish the charge of the rechargeable UAV. The rechargeable UAVs may resume flight when charging has been completed. The recharging of rechargeable UAVs by the power UAV may be performed while the power UAV remains airborne.

The strength of a magnetic field from a conductor of an overhead power line decreases as the distance from the conductor increases. To generate a current for recharging rechargeable UAVs, a receptor of a power UAV is positioned in the magnetic field. While larger currents can be generated by positioning the receptor closer to the conductor (i.e., in a stronger portion of the magnet field), the power UAV may maintain a minimum distance to prevent inadvertent contact between the power UAV (e.g., the receptor of the power UAV) and the power lines that could cause the power UAV to crash or damage the power lines.

Magnetic fields emanating from the power lines may damage sensitive electronics (e.g., flight control systems, communication systems, etc.) of the power UAV or the rechargeable UAVs. The power UAV may use one or more shielding substrate(s) to significantly reduce the strength of magnetic field at the electronics to protect these electronics. The shielding substrate(s) can be heavy, which can negatively affect the flight performance of the power UAV or block the movement of recharging UAVs on or around the power UAV. In some implementations, the shielding substrates may be adjustable into different orientations or positions. For example, the power UAV may adjust the shielding substrate(s) based on the location of the power UAV, the location of the rechargeable UAV, the location of the receptor with respect to the conductor, or whether the power UAV is generating current.

Power UAVs are portable and can be dispatched to various locations. Dispatch to a location along a conductor of a power delivery system may be in response to signals wirelessly communicated from a remote system, another UAV (e.g. a rechargeable UAV), or the power delivery system. Power UAVs may include circuitry for determining the power drawn from the overhead power lines by the receptor or the power provided to a rechargeable UAV. Fees may be calculated based on the power. Power UAVs may also include circuitry (e.g. current measurement or thermal imaging circuitry) for monitoring aspects of the power delivery system, and a fee or offset for power used by the power UAV may be calculated based on monitoring provided by the power UAV.

FIG. 1 illustrates a block diagram of an overall environment that includes a UAV power generation system 100 and a power delivery system 104. The power delivery system 104 is a system for distributing electrical energy. The power delivery system 104 may include or be connected to the power grid and includes known or later developed components. The power delivery system 104 may include power generating components, switches, below-ground lines, networks and computers, and electrical substations. For example, the power delivery system may provide bulk transfer of electrical energy from generating power plants to electrical substations. The power delivery system 104 includes a conductor 102, also referred to as "conductors." The conductor 102 carries an alternating current ("AC") power signal.

In one or more implementations, the power delivery system 104 includes a network for delivering electricity from suppliers to consumers. In some implementations, the conductor 102 includes a cable of an overhead power line. The conductor 102 may be used for transmission or distribution of electrical energy via an AC power signal. The AC power signal may be a "high voltage" signal. "High voltage" means voltages greater than 100 kV. Signal characteristics of typical AC power signals may vary by geographic region. Most power delivery systems in North America use a 60 Hertz ("Hz") signal. A 50 Hz signal is used in Europe and most other locations.

The AC power signal produces electric and magnetic fields that emanate from the conductor 102. Electric fields are produced by the voltage of the AC power signal and increase in strength as the voltage increases. Magnetic fields result from the flow of current through the conductor 102 and increase in strength with increasing current. The characteristics of the AC power signal carried by the conductor 102 can influence the characteristics of the electric fields and magnetic fields that emanate from the conductor 102. In general, the strength of magnetic fields emanating from the conductor 102 decreases with increasing distance from the conductor 102. The characteristics of the magnetic fields emanating from the conductor 102 at a location also depends on the type (e.g. composition) of the conductor 102 and the insulation at the location. For example, the conductor 102 may include an insulator component as an outer layer or it may use ambient air as an insulator to decrease the magnetic field emanating from the conductor. A location of the conductor 102 having an insulation layer that is worn or damaged may cause magnetic fields of greater strength to be present.

UAV power generation system 100 includes a power UAV 110 and a remote system 150, according to an implementation. FIG. 1 is not drawn to scale. For example, the power UAV 110 is shown larger with respect to the conductor 102 to facilitate discussion. The power UAV 110 includes a frame 112, a receptor 114, a flight mechanism 120, and power UAV electronics 121. The frame 112 is a structure that supports components of the power UAV 110. Components of the power UAV 110 may be coupled directly or indirectly (e.g., through other components) to the frame 112. The power UAV 110 may include a receptor coupling element 116, a first shielding substrate 122, a platform 126, a second shielding substrate 128, or a UAV coupling element 134. In operation, the power UAV 110 may fly near the conductor 102 and generate power from the magnetic fields emanating from the conductor 102.

In some implementations, the power UAV 110 "receives" a rechargeable UAV, such as a rechargeable UAV 130, by the rechargeable UAV landing on the platform 126. In some implementations, the power UAV 110 may "release" the rechargeable UAV by the rechargeable UAV flying away from the power UAV. The power UAV 110 may couple mechanically or electrically to the rechargeable UAV. In one or more implementations, the power UAV 110 receiving the rechargeable UAV may include establishing an electrical or a mechanical coupling between the power UAV 110 and the rechargeable UAV. Correspondingly, the power UAV 110 releasing the rechargeable UAV may include electrical or mechanical decoupling between the power UAV 110 and the rechargeable UAV. The power UAV may receive or release a rechargeable UAV while the power UAV 110 is flying.

After a rechargeable UAV 130 has been received by the power UAV 110, current may be provided by the power UAV 110 to the rechargeable UAV 130. In some implementations, an energy storage device (e.g. a battery) is provided to the rechargeable UAV 130. The power UAV 110 may "swap out" or replace the battery of the rechargeable UAV 130 with an energy storage device charged from the magnetic field of the conductor 102 as disclosed herein. In such an example, the energy storage device may be provided while the power UAV 110 is flying.

The frame 112 is a structure that supports components of the power UAV 110. Components of the power UAV 110 may be coupled directly or indirectly (e.g., through other components or structures) to the frame 112. In this example, the flight mechanism 120 includes a plurality of propellers used to fly the power UAV 110. Alternatively, the flight mechanism 120 may utilize known or later developed propulsion systems. For example, fans, jets, turbojets, turbo fans, balloons, jet engines, and the like may be used to propel the power UAV 110.

The magnetic flux density (B) at a point a distance (r) from an infinitely long conductor placed in a medium with magnetic permeability (μ) and carrying an AC signal having a peak amplitude ($I_0$) and frequency (w) may be described by the following equation.

$$B = \frac{\mu * I * \sin(wt)}{2\pi r}$$

The receptor 114 includes one or more secondary coils (also referred to as "secondary transformers"). The conductor 102 acts as a transformer primary of a power transformer and the one or more secondary coils act as a transformer secondary such that the receptor 114 generates a current using the magnetic field emanating from the conductor 102.

The voltage (V) that is induced across a secondary coil of the power UAV 110 may be expressed by the following equation.

$$V \propto \frac{\partial B}{\partial t} \propto \frac{\mu * I * \cos(wt)}{2\pi r}$$

For a power lines carrying large currents, the induced voltage at the secondary coil can provide sufficient power to meet the power needs of the power UAV 110 and/or sufficient energy for an energy storage device to be charged quickly.

The number of coils, the number of turns in the coil(s), the type of material used for the coil(s), the inductance of the coil(s), electrical connections between coil(s), or dimensions of the coil (e.g. area or length) of the receptor 114 may be modified to achieve desired receptor properties. In some implementations, the receptor 114 includes a secondary coil tuned to a resonance frequency of the power signal passing through the conductor 102. For example, when generating a current from a conductor carrying a 60 Hz signal, the secondary coil may be tuned to have a resonance frequency of 60 Hz. In some implementations, the power UAV 110 may couple to an overhead power line through a wired connection such that power is transferred directly from the conductor 102 to the power UAV 110 while the power UAV is flying.

The receptor 114 may include or be coupled to a power conditioning circuit. The power generated by the receptor 114 may be AC power. The power conditioning circuit may include a rectifying component or filtering component(s) to rectify generated AC power to stable direct current ("DC") power. DC power may be preferred or required for charging certain energy storage devices such as batteries. In one or more implementations, the power conditioning circuit may include a DC/DC converter for stepping up/down the generated DC power.

The receptor 114 may be mechanically coupled to the frame 112 via a receptor coupling element 116. In one or more other implementations, the receptor coupling element 116 is movable such that the position of the receptor 114 can be adjusted to different locations or orientations with respect to the frame 112 or the conductor 102. For example, the receptor coupling element 116 may include a cable that may be lengthened, shortened, or rotated to adjust the position of the receptor 114. In another example, the receptor coupling element 116 includes a mechanical arm for adjusting the position of the receptor 114 with respect to the conductor 102 or frame 112.

Platform 126 is coupled to the frame 112, and comprises a structure that supports takeoff, landing, electrical, or mechanical coupling of one or more rechargeable UAVs 130. The platform 126 may include the UAV coupling element 134 for mechanically or electronically coupling the power UAV 110 to the rechargeable UAV 130. In some implementations, the platform 126 may have a size that is large enough to support a plurality of rechargeable UAVs. For example, the platform 126 may include more than one platform coupled to the frame 112. The UAV coupling element 134 may include a mechanical device (e.g. a mechanical arm or robotic arm) that may assist with releasing (e.g. takeoff) or receiving (e.g. landing) the rechargeable UAV, or positioning of the rechargeable UAV 130. In some implementations, the mechanical device of the platform 126 enables electrical or mechanical coupling of the power UAV 110 and the rechargeable UAV 130. For example, the mechanical device may physically connect the power UAV 110 and the rechargeable UAV 130 by plugging in a connector. In some implementations, the platform 126 includes components to inductively charge the rechargeable UAV 130.

The power UAV electronics 121 of the power UAV 110 include various electronics used to operate the power UAV 110. Power UAV electronics 121 may include components such as sensors, control electronics, communication electronics, energy storage devices (e.g. batteries), memory, data stores, or navigation systems. In one or more implementations, the current generated by the receptor 114 is provided to an energy storage device of the power UAV 110 for storage. The power UAV electronics 121 may include at least a portion of the power UAV control system discussed below in connection with FIG. 8. Unless shielded, components of the power UAV electronics 121 may be damaged or negatively affected when exposed to magnetic fields from the conductor 102. The relative sensitivity of each of the components of the power UAV electronics 121 to magnetic fields may vary.

In some implementations, the power UAV 110 includes the first shielding substrate 122. The first shielding substrate 122 is coupled to the frame 112 and includes a material that shields (also referred to as "weakening" or "blocking") the power UAV electronics 121 from the magnetic fields emanating from a conductor. The first shielding substrate may be positioned between the receptor 114 and the power UAV electronics 121. In some implementations, the strength of a magnetic field at an inner portion or side of the first shielding substrate 122 is less than the strength of the magnetic field at an outer portion or side of the first shielding substrate 122. For example, the first shielding substrate 122 may be configured to reduce the strength of the magnetic field by at least 90% from the outer portion to the inner portion. The shielding capability of the first shielding substrate 122 depends on the frequency of the power signal, and the dimensions and composition of the first shielding substrate 122. In some implementations, a width of a portion of the shielding substrate is thicker in some areas to provide greater shielding capabilities for shielding more sensitive components. For example, thicker portions of the shielding substrate may shield at least 95% of the magnetic field.

The magnetic permeability of the first shielding substrate 122 may be about $1.0 \times 10^{-3}$ H/m to shield a magnetic field from the conductor 102 carrying an AC power signal at about 60 Hz. As used herein, "about" means+/−15%. The first shielding substrate 122 may include a ferrite material, such as iron, with desirable magnetic shielding properties for AC power signals operating at about 60 Hz. The first shielding substrate 122 includes a material that blocks or shields magnetic fields from the conductor 102 for the frequency of the AC voltage signal carried by the conductor 102. The first shielding substrate 122 may include a mesh, for example, from pieces of material that are woven together. The first shielding substrate 122 may have holes. In some implementations, the holes have widths that are smaller than a wavelength of a magnetic field emanating from the conductor 102. In some implementations, the first shielding substrate is a Faraday cage that is located adjacent to one or more components of the power UAV electronics 121. The Faraday cage may be configured to protect at least one component of the power UAV electronics 121 from electromagnetic energy emanating from the conductor or other components of the power delivery system 104.

In one of more implementations, the first shielding substrate 122 is adjustable to different orientations based on the location of the power UAV electronics 121 relative to the conductor 102 such that at least a portion (e.g. at least one component) of the power UAV electronics 121 remain shielded while the power UAV 110 changes positions around the conductor 102. In implementations where the receptor 114 is adjustable, the first shielding substrate 122 may correspondingly adjust based on a location of the receptor 114, or the conductor 102, with respect to the power UAV electronics 121. Such adjustment of the first shielding substrate 122 may be performed automatically. For example, the first shielding substrate 122 may adjust to a first position if electromagnetic energy is emanating from a component above the power UAV 110, and a second position if electromagnetic energy is emanating from a component that is below the power UAV 110.

The remote system 150 includes a computing system that may transmit signals to or receive signals from the power UAV 110. At least one of the power UAV 110, the remote system 150, the rechargeable UAV 130, or the power delivery system 104 may include suitable communication electronics for communicating with at least one of the others. Communication may be by one-way or two-way communication via direct, indirect, wired, or wireless communication or combinations thereof. In some implementations, deployment of the power UAV 110 to a location along the conductor 102 may be in response to signals or commands communicated to the power UAV 110 from at least one of another UAV, the remote system 150, or the power delivery system 104. Deployment of the power UAV 110 is discussed in further detail below with respect to FIG. 5.

Once the power UAV 110 has been deployed, the power UAV 110 aerially navigates to a location along the conductor 102 and generates a current using the receptor 114. Generating current using the receptor 114 is discussed in more detail below with respect to FIG. 3. While generating the current from the conductor 102, the power UAV 110 maintains a safe distance or "safety range" from the conductor 102. This safe distance may be determined periodically and may depend on one or more of the location of the conductor 102, the weather at the location (e.g. amount of wind, direction of wind, etc.), the cargo carried by power UAV 110 (e.g. the quantity of rechargeable UAVs on or expected to be on the platform 126), the frequency of the power signal transferred by the conductor 102, or whether a rechargeable UAV is expected to take off or land within a time frame (e.g. 30 seconds).

In some implementations, a rechargeable UAV 130 lands on the platform 126 while the power UAV 110 is flying. The rechargeable UAV 130 may land on the platform 126 before, during, or after the power UAV 110 has initiated current generation. Similarly, the rechargeable UAV 130 may take off from the platform 126 while the power UAV 110 is flying before, during, after the power UAV 110 has initiated current generation.

In one or more implementations, the power UAV 110 is positioned adjacent the power lines, generates current from the conductor 102 that is used to charge an energy storage device, and then flies away from the conductor 102 to a location where the magnetic field emanating from the conductor 102 is weaker. The rechargeable UAV 130 then lands on the power UAV 110, is coupled to the power UAV 110, and a charging current is provided from the energy storage device of the power UAV 110 to the rechargeable UAV 130. This implementation reduces or eliminates the need for shielding to protect the rechargeable UAV 130.

The power UAV 110 may be coupled (mechanically or electrically) to the rechargeable UAV 130 using an UAV coupling element 134. The UAV coupling element 134 may include a magnet, a mechanism for attaching, securing, or electrically connecting the power UAV 110 and the rechargeable UAV 130. In at least one implementation, electrical coupling between the power UAV 110 and the rechargeable UAV is accomplished by an inductive connection secured by a magnet. In some implementations, the UAV coupling element 134 provides capacitive coupling between the power UAV 110 and the rechargeable UAV 130.

A second shielding substrate 128 may be used where the rechargeable UAV 130 lands or is present on the platform 126 of the power UAV 110 while the power UAV 110 is generating current. The second shielding substrate 128 is configured to shield electronics of the rechargeable UAV 130, and may be adjustable so the rechargeable UAV 130 may be shielded at certain locations on the platform 126 or for different orientations of the receptor 114 or conductor 102. In general, it is desirable to limit the size of the shielding substrate because shielding adds weight to the power UAV 110.

The material(s) used in the second shielding substrate 128 may be selected for its magnetic permeability or based on the frequency of the AC power signal carried by the conductor 102. Similar considerations and implementations may be used for the second shielding substrate 128 as were discussed above with respect to the first shielding substrate 122. For example, the second shielding substrate 128 may include material(s) and positioned such that the magnetic field from the conductor 102 is reduced by at least 90% from an outer portion or side to an inner portion or side, where the inner portion or side is adjacent to at least a portion of electronics of the rechargeable UAV 130.

In another example, the second shielding substrate 128 includes a Faraday cage. The Faraday cage may be formed from a mesh material. The Faraday cage may be movable to a position such that it surrounds at least a portion of the rechargeable UAV to protect the rechargeable UAV from magnetic fields prior to the power UAV 110 moving closer to the conductor 102. After the power UAV 110 moves away from the conductor 102, the Faraday cage may be moved (e.g. lifted) so that the rechargeable UAV may be moved to a different location on the platform or depart from the power UAV 110. The Faraday cage may include a camera for capturing images of the rechargeable UAV. The captured images may be transmitted to the remote system 150 or to the rechargeable UAV, for example. In other implementations, the second shielding substrate 128 is included on a rechargeable UAV rather than the power UAV 110.

Figure 2A:
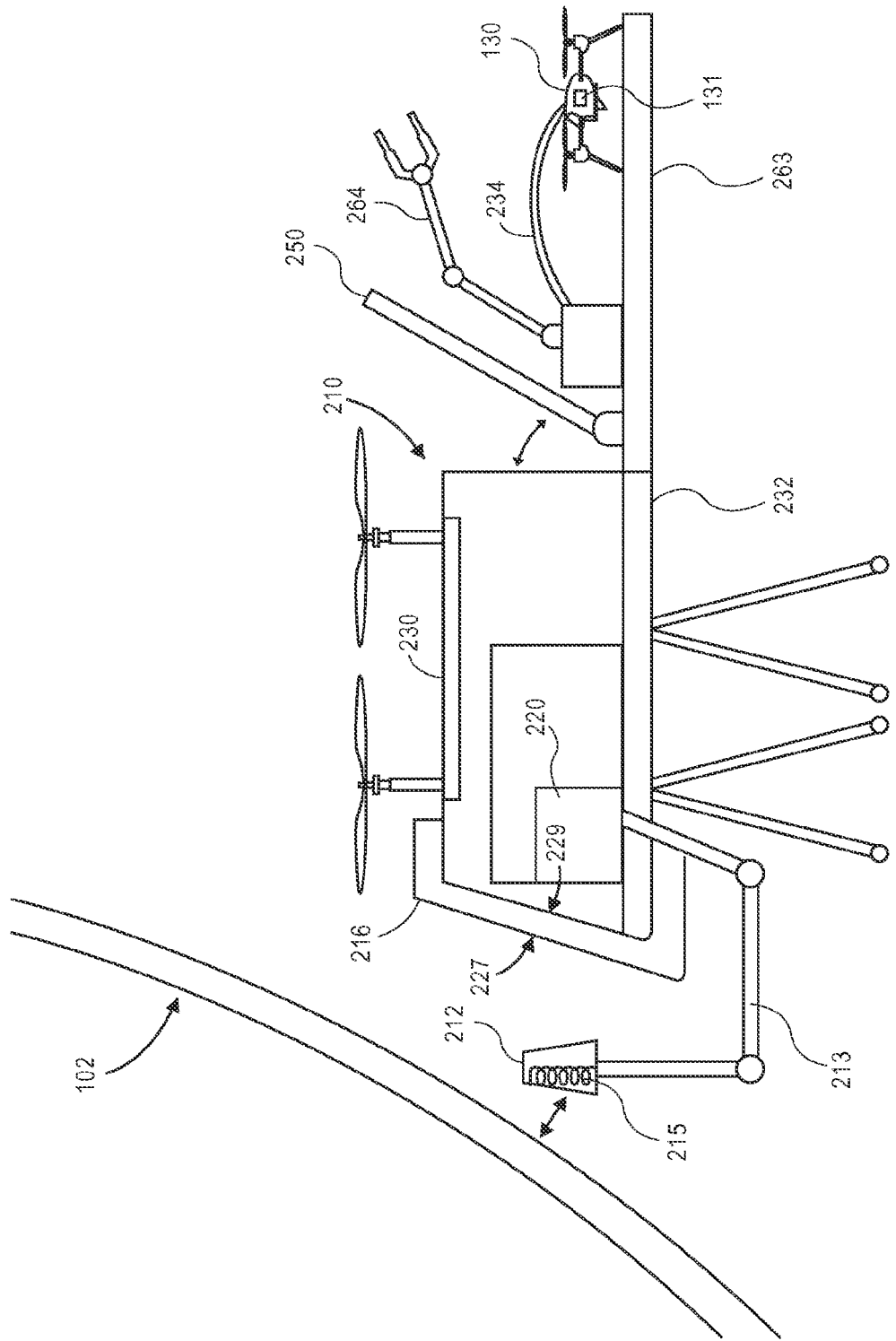
FIG. 2A depicts a block diagram of a power UAV having a receptor attached to an elongated member, according to an implementation.

FIG. 2A shows an example block diagram of a power UAV 210, according to an implementation. The power UAV 210 includes a receptor 212 having a secondary coil 215. In some implementations, the secondary coil 215 includes more than one secondary coil. The receptor 212 is attached on an end of a receptor adjustment element 213. The power UAV 210 also includes a first shielding substrate 216, power UAV electronics 220, a flight mechanism 230, a second shielding substrate 250, and a platform 263. The components of the power UAV may be coupled (directly or indirectly) to the frame 232.

In this example, the rechargeable UAV 130 is on the platform 263 and has been received by the power UAV 210. As shown, the rechargeable UAV 130 is coupled to power UAV 210 via the UAV coupling component 234. UAV coupling component 234 may provide a wired or wireless electrical connection. In one or more implementations, the rechargeable UAV 130 includes an energy storage device that may be rechargeable by way of a current provided from the power UAV 210 via the coupling cable 234. The flight mechanism 230 is shown as using propellers, but it will be understood that other devices for flying the power UAV 210, such those discussed above with respect to the power UAV 110 of FIG. 1.

In some implementations, the power UAV 210 and a rechargeable UAV 130 both include removable energy storage devices that that may be switched with one another. The power UAV 210 may recharge a removable energy storage device using the receptor 212 and then switch the removable energy storage device to the rechargeable UAV 130. A rechargeable UAV 130 may be received by the power UAV 210, and then the removable energy devices are switched by mechanical arm 264. Switching removable energy devices may provide the rechargeable UAV 130 with recharged power supply in a short while so the rechargeable UAV 130 can quickly resume flight.

The mechanical arm 264 may help facilitate receiving or releasing a rechargeable UAV 130 by mechanically or electrically coupling the UAV connecting element 234 to the rechargeable UAV 130. The mechanical arm may include sensors and may be programmable to have functions similar to a human arm. The mechanical arm may secure a rechargeable UAV 130 as it lands on the platform and disconnect mechanical or electrical connections prior to release.

A position or orientation of the receptor 212 with respect to the frame 232 may be adjustable with the receptor adjustment element 213 to position the receptor 212 relative to a conductor 102. The receptor adjustment element 213 may pivot at one or more locations such that a distance or space between receptor and the conductor increases or decrease.

The first shielding substrate 216 has an outer side 227 and an inner side 229. The inner side 229 is located closer to the electronics 220 then the outer side 227. As shown, the first shielding substrate 216 has a "C shape," but it will be appreciated that other shapes may be used for the first shielding substrate 216. The shielding capabilities may depend on the dimensions (e.g. width, thickness) of the shielding material(s) or between shielding material(s) included the shielding substrate 216. Suitable shielding substrates for the first shielding substrate 216 are discussed in more detail herein in connection with first shielding substrate 122 and second shielding substrate 128 of FIG. 1. In one implementation, the strength of the magnetic field from the conductor 102 is reduced by at least 90% from the outer side 227 to the inner side 229.

The second shielding substrate 250 may adjust to shield at least a portion of rechargeable UAV electronics 131 of the rechargeable UAV 130 from the magnetic field emanating from the conductor 102. As shown, the second shielding substrate 250 may adjust by pivoting. Pivoting the second shielding substrate 250 may be useful to free space for mechanical arm 264. In another implementation, the second shielding substrate 250 may be positioned over the rechargeable UAV electronics 131. In yet another implementation, the second shielding substrate 250 may be extendable to a position over the rechargeable UAV electronics 131. Suitable shielding substrates for the second shielding substrate 250 are discussed in more detail herein in connection with first shielding substrate 122 and second shielding substrate 128 of FIG. 1.

Figure 2B:
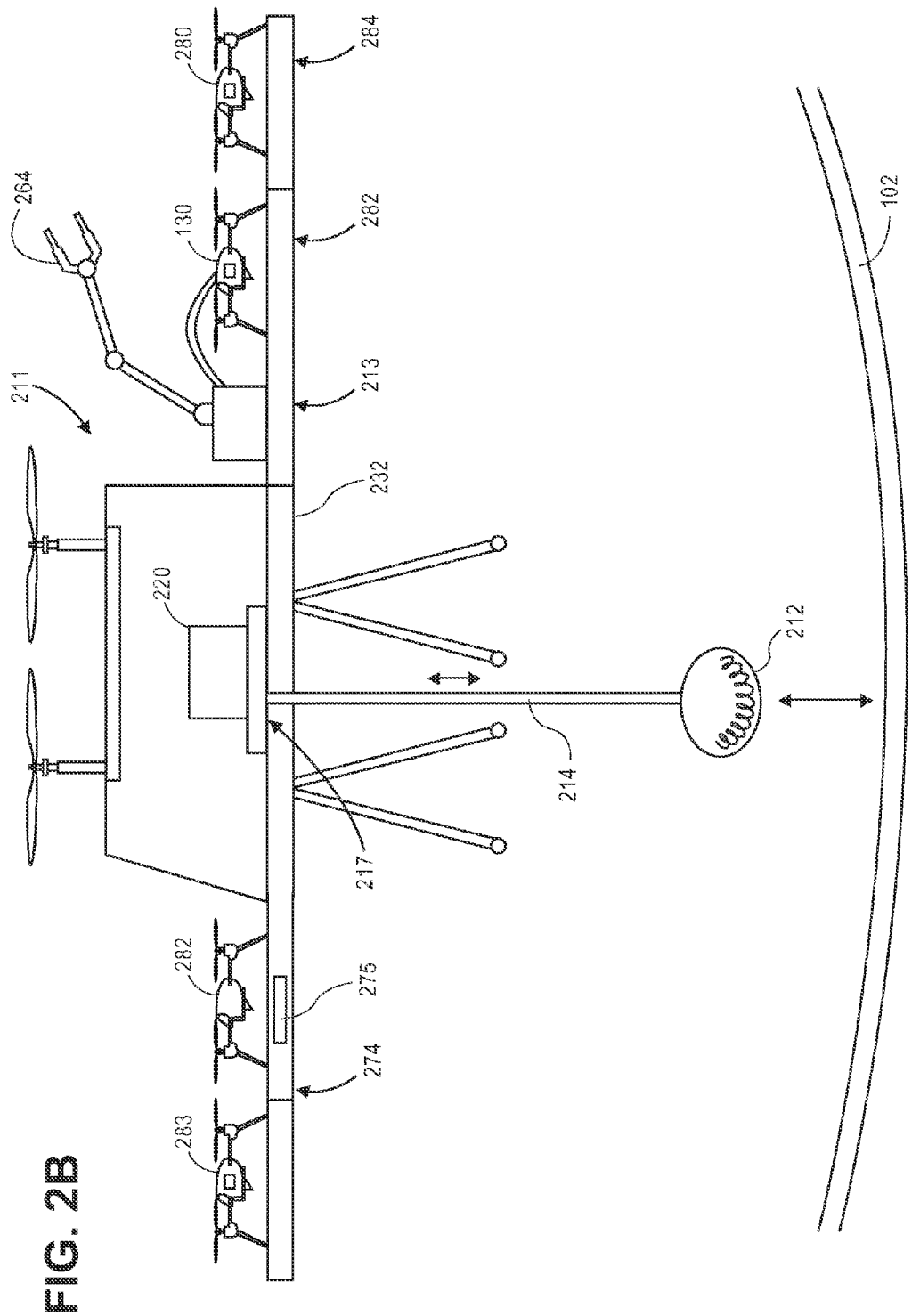
FIG. 2B depicts a block diagram of a power UAV having a receptor on a cable, according to an implementation.

Referring now to FIG. 2B, another example of a power UAV 211 is shown flying above the conductor 102, according to an implementation. In this example, power UAV 211 includes a first platform 273 and a second platform 274 that are coupled to the frame 232. The first platform 273 and the second platform 274 may extend from the frame 232 in different directions. Rechargeable UAVs may be received at the first platform 273 or the second platform 274. It may be desirable to evenly distribute the weight of rechargeable UAVs on different platforms of the power UAV 211.

The power UAV 211 has a receptor 212 coupled to the frame 232 via a receptor adjustment element 214 that may move the receptor 212 towards or away from the frame 232 or the conductor 202. In one or more implementations, the receptor adjustment element 214 includes a cable that can be used to extend or retract the receptor 212 so that it can be positioned a desired distance from the conductor 102 or the frame 232. In some implementations, the power UAV 211 may adjust the position of the receptor 212 with respect to the conductor 102 by flying the power UAV 211 towards or away from the conductor 102.

The receptor 212 is at a different location relative to the frame 232 in power UAV 211 compared to power UAV 210 of FIG. 2A. As shown, a shielding substrate 217 is at a different location relative to the frame 232 compared to the first shielding substrate 216 of the power UAV 210 of FIG. 2A in order to be between electronics 220 and the receptor 212 to shield the electronics 220 from the magnetic field emanating from the conductor 102. Compared to other power UAV implementations (e.g. power UAV 210 in FIG. 2A), the shielding substrate 217 may be thinner, lighter, or omitted because power UAV electronics 220 may be at a location where electromagnetic energy emanating from the conductor 102 is not strong enough to negatively impact the power UAV electronics 220 or electronics of rechargeable UAVs that are present on the first platform 273.

As shown in this example, a rechargeable UAV 130 is at a charging position 282 of the first platform 273 and another rechargeable UAV 280 is at a takeoff/landing position 284 of the first platform 273. The mechanical arm 264 may move the rechargeable UAVs 130, 280 on the first platform 273 and assist with or implement mechanical coupling or electrical coupling between the rechargeable UAVs 130, 280 and the power UAV 211. The second platform 274 may be used to receive and release UAVs, such as rechargeable UAVs 282, 283. In one or more implementations, the second platform 274 includes a coupling component for mechanically or electrically coupling rechargeable UAVs to the power UAV 211. The second platform 274 may include an inductive charging mechanism 275 that is capable of charging a rechargeable UAV via inductive charging. For example, power may be provided to the rechargeable UAV 282 from the second UAV 211 via the induction mechanism 275 when the rechargeable UAV is positioned near the induction mechanism 275.

Figure 3:
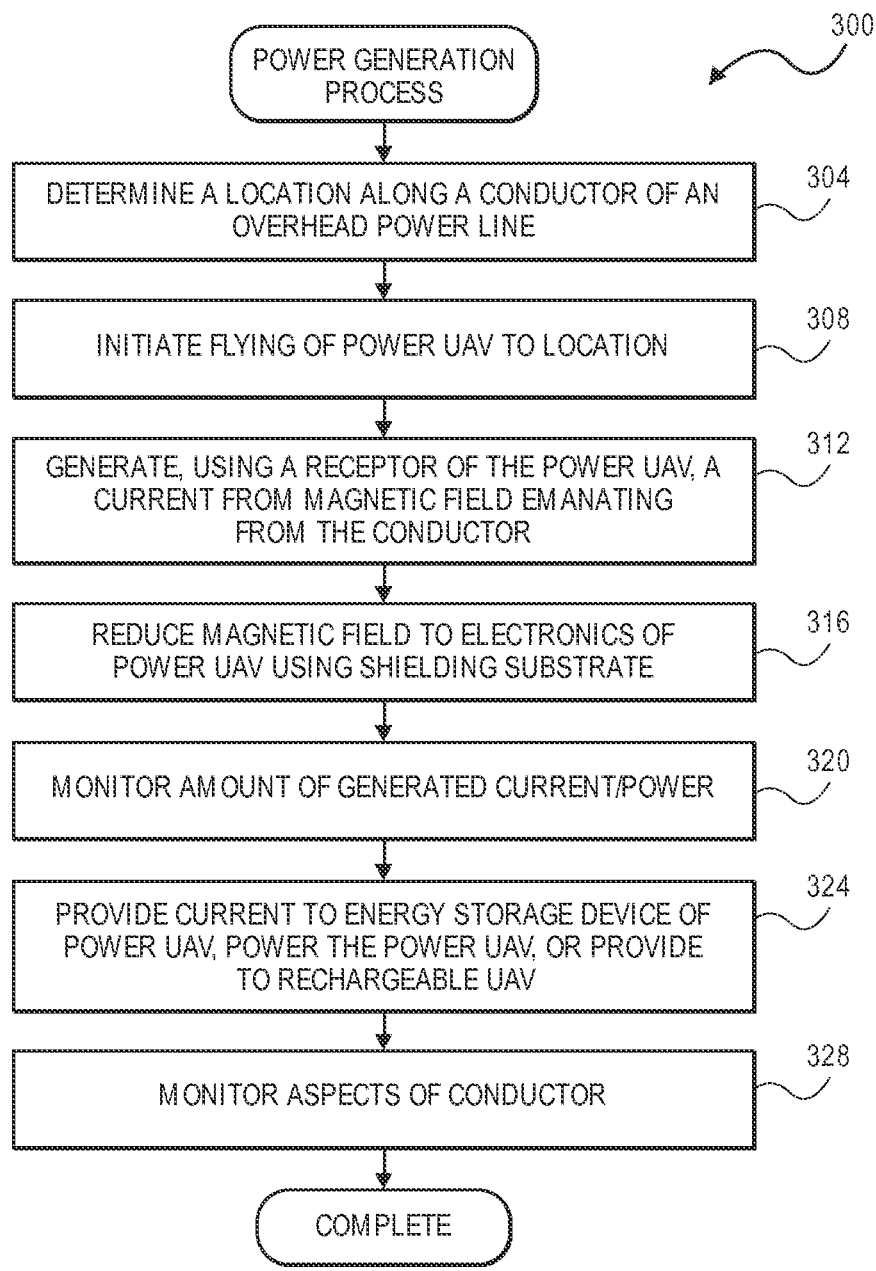
FIG. 3 is a flow diagram of an example process for generating a current using a power UAV, according to an implementation.

FIG. 3 is a flow diagram illustrating an example process 300 for generating power, according to an implementation. A location along a conductor of an overhead power line may be determined, as in 304. The location may be determined by a power UAV, such as power UAVs 110, 210, or 211 or by the remote system 150, each of which are discussed above with respect to FIGS. 1, 2A, and 2B. The location may be determined based on the cost of power at various locations (discussed further below), the power loss at various locations, the need or demand at various locations, planned navigation paths for rechargeable UAVs, requests communicated from a power delivery system, requests from a rechargeable UAV, etc. For example, a rechargeable UAV may transmit a signal to the remote system indicating that it will need additional power. The remote system may determine a location along a conductor where the power UAV may meet up with the rechargeable UAV by querying a database for locations along the conductor near the rechargeable UAV where strong magnetic fields are present. In another example, the location along the conductor is determined by onboard electronics of the power UAV. Rechargeable UAVs at different locations may transmit recharging requests with flight path information on the desired flight paths for each rechargeable UAV. The remote system or a power UAV, upon receiving the recharging requests, may determine a location along the conductor based on the anticipated locations of the rechargeable UAVs, their current locations, and the flight path information. In yet another implementation, a power delivery system may transmit a request for monitoring of a characteristic (e.g., magnetic field strength, temperature, wind speed) at a location along the conductor. In still another example, a remote system or a power UAV may determine a location based on rechargeable UAV traffic patterns. The location may be determined based on information that indicates that many rechargeable UAVs are flying towards the location.

Upon determining a location, flight of the power UAV to the location may be initiated, as in 308. The power UAV may be resting on a ground or a support structure prior to the initiation of flying to the determined location. In one or more implementations, the power UAV is already airborne when initiation of flying the power UAV to the determined location occurs. A power UAV may charge an energy storage device at a first location along a conductor and then flying is initiated to a different location where charging of the energy storage device may resume or charging of a rechargeable UAV may be initiated. In another example, flying to the location may be initiated after a price for power from a conductor drops below a threshold value. The power UAV may initiate flight to the location at night when demand for power drops and power rates may be lower. The power UAV may initiate flight to recharge a plurality of energy storage devices during low demand periods and charge rechargeable UAVs using the energy storage devices during periods of high demand. In other examples, flight of the UAV may be initiated in response to a rechargeable UAV landing on the platform of the power UAV, or winds or other external forces present at the location drop below a threshold amount.

When the power UAV arrives at the location, a current is generated from the magnetic field emanating from the conductor of the overhead power line, as in 312. A switch may enable or disable the generation of current. In one example, the power UAV may position itself a defined distance above the conductor and lower or otherwise position the receptor, using the receptor connection component, a second defined distance from the conductor. The defined distance or the second defined distance may be determined based on an amount of external forces present at the location, the strength of magnetic fields at the location, etc. If winds are present between 0 and 5 miles per hour the defined distance and the second defined distance may have set values. If winds are greater than 5 miles per hour at the location or a rechargeable UAV is expected to land on the platform of the power UAV within a threshold time period, the defined distance or the second defined distance may have a second set of values that provide increased distance between the power UAV and the conductor.

A first shielding substrate may shield or reduce the strength of the magnetic field from the conductor so that, as discussed above with respect to FIGS. 1, 2A, and 2B, the magnetic field does not damage or otherwise negatively affect the electronics of the power UAV, as in 316. The first shielding substrate may include a material that reduces the strength of the magnetic field for the frequency of the power signal in the conductor. In one or more implementations, the first shielding substrate may be adjustable to different positions on the power UAV so the electronics remain shielded regardless of the position of the power UAV with respect to the conductor of the power line. In other implementations, the first substrate may encompass the electronics of the power UAV so the electronics are protected regardless of the position of the power UAV.

An amount of current/power generated by the power UAV may be monitored, as in 320. The current generated by the power UAV may be monitored by measuring the current generated by the receptor with a current sensor coupled to the receptor. In another example, the current generated by the power UAV may be monitored by measuring the time required to charge an energy storage device a defined amount. In yet another example, power generated may be monitored with a power meter. The current/power generation information may be stored in a data store of the power UAV or communicated to a remote system or a server of the power delivery system. As discussed further below, a fee may be charged for generating current/power using the magnetic field from a conductor. The fee may be based on current generated, the energy drawn from the power delivery system, etc. The current/power generation information may be stored in a data store along with related information. For example, the data store may also maintain information indicating a time during which the current/power was generated, a location (e.g., GPS coordinates or other location identifier) of the power UAV during current generation, a strength of the magnetic field used for current generation, etc.

The generated current/power may be provided to an energy storage device of the power UAV or provided to a rechargeable UAV that is coupled to the power UAV, as in box 324. For example, the generated current/power may be stored in an energy storage device of the power UAV. Current from the energy storage device may then be provided to the rechargeable UAV to recharge the rechargeable UAV or the energy storage device of the rechargeable UAV may be replaced with the charged energy storage device. Providing current to the rechargeable UAV may be via a wired coupling or wireless (e.g. inductive) coupling.

One or more characteristics of the conductor or components of the power delivery system may also be monitored, as in 328. Electrical properties, such as temperature, phase, or magnitude of the power signal, an amount of power lost through the conductor, magnetic flux density, etc., of the conductor, may be monitored using sensors of the power UAV. Alternatively, or in addition thereto, the power UAV may obtain images, such as infrared images of a component of the power delivery system that may be used to assess frequencies emitted from the conductor or power delivery system components, damage or status of the component, etc. In still other examples, external factors such as wind temperature, humidity, precipitation, etc., may likewise be monitored. In still other examples, characteristics of the rechargeable UAV may be monitored by the power UAV. In one implementation, the power UAV captures image(s) of the rechargeable UAV while charging the rechargeable UAV. The images may be captured with an image capture device attached or embedded in a shielding substrate for shielding electronics of the rechargeable UAV.

Figure 4:
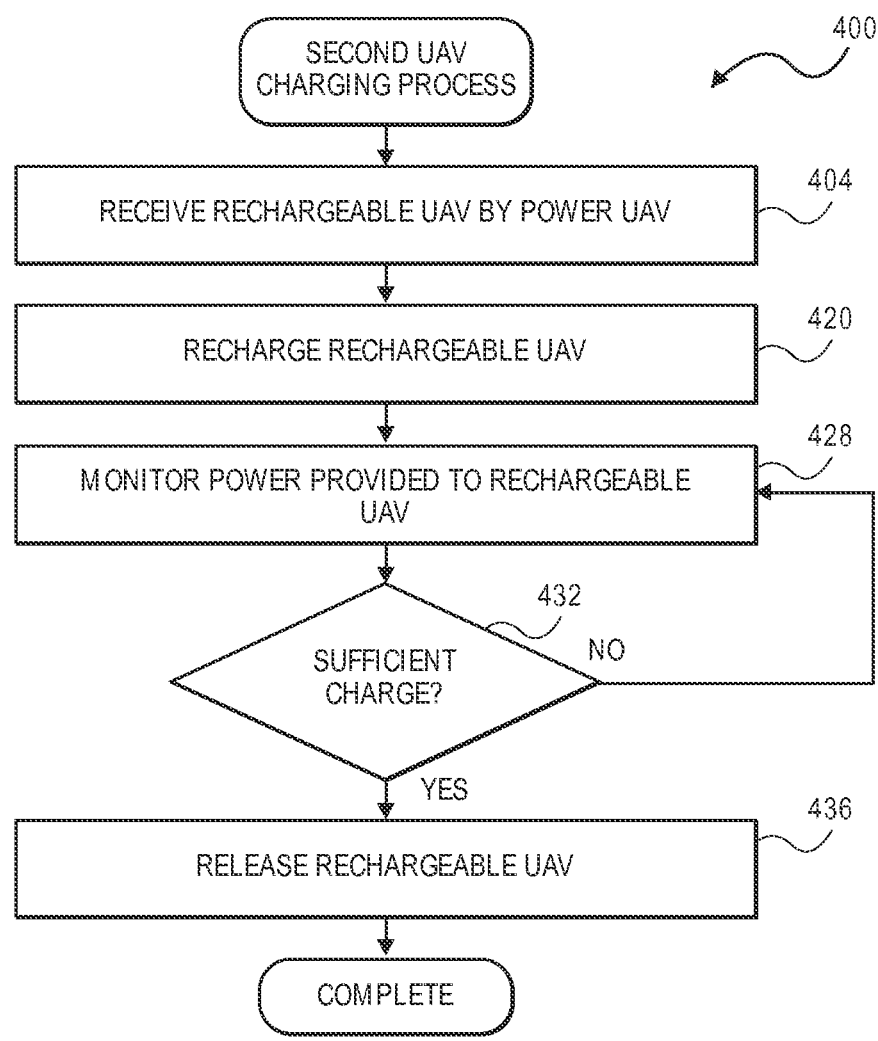
FIG. 4 is a flow diagram illustrating an example process for charging one or more second UAVs, according to an implementation.

FIG. 4 is a flow diagram illustrating an example process 400 for charging a rechargeable UAV, according to an implementation. A rechargeable UAV may be received by a power UAV, as in 404. Receiving the rechargeable UAV may involve the rechargeable UAV landing on a platform of the power UAV. Receiving may occur when the power UAV is landed or flying. The rechargeable UAV may be moved to different positions or attached to the platform or the frame of the power UAV. Receiving may also include electrically coupling the power UAV and the rechargeable UAV so that a current can be provided to the rechargeable UAV. Various mechanisms may be used by the power UAV or the rechargeable UAV to implement the electrical coupling. A mechanical arm or other mechanical device of the power UAV may be used to the implement the receiving and electrical coupling. In some implementations, the power UAV may be configured to support a plurality of rechargeable UAVs and more than one rechargeable UAVs may be received by the power UAV.

When a rechargeable UAV is received by the power UAV, it may be charged, as in 420. The rechargeable UAV may be charged by providing current generated by the receptor to an energy storage device of the rechargeable UAV. Alternatively, current may be provided from an energy storage device of the power UAV to the rechargeable UAV. In these examples, the current may be provided to the energy storage device of the second UAV via a wired or wireless (e.g. inductive) connection. In another example, the energy storage device of the rechargeable UAV may be removable, and the energy storage device of the rechargeable UAV may be replaced or swapped with a charged energy storage device of the power UAV. In one or more implementations, the power UAV may generate current with the receptor to recharge the energy storage device retrieved from the rechargeable UAV after the rechargeable UAV has been released from the power UAV and resumed its flight path. Once the retrieved energy storage device has been recharged, it may charge another rechargeable UAV or it may replace an energy storage device of another rechargeable UAV.

An amount of power provided to the rechargeable UAV may be monitored, as in 424. Power monitoring may be performed with a current sensor or power meter that measures the current/power that is provided to the rechargeable UAV. Power monitoring information may be stored and later used to determine a fee to charge for the power provided to the rechargeable UAV or obtained from the conductor.

A charge level of the rechargeable UAV may also be monitored, as in 428. For example, monitoring the charge level may include a rechargeable UAV monitoring a charge level of the one or more energy storage devices and providing an indication of such charge level to the power UAV. In another example, the power UAV may estimate the charge level of a rechargeable UAV based on the amount of current provided to rechargeable UAV.

As the charge is provided, a determination is made whether the rechargeable UAV has received a sufficient charge, as in 432. For example, a sufficient charge may be determined by comparing the charge level of the rechargeable UAV with a threshold value. In another example, a sufficient charge may be determined by monitoring the charging time or an amount of current provided to the rechargeable UAV. In another example, a sufficient charge may be determined based on the charge level and the planned flight path or destination of the rechargeable UAV. If it is determined that a sufficient charge has not been provided, the example process returns to block 428 and continues.

If it is determined that the rechargeable UAV has received a sufficient charge, the power UAV releases the rechargeable UAV, as in 436. The power UAV may be flying or resting when the rechargeable UAV is released. Releasing the rechargeable UAV may include detaching, disconnecting, or decoupling (electrically or mechanically) the rechargeable UAV from the power UAV. In addition, the rechargeable UAV may be moved to a takeoff zone of the power UAV with sufficient space for the rechargeable UAV to initiate flight. A mechanical device (e.g. a mechanical arm) of the power UAV may assist with releasing the rechargeable UAV by disconnecting electrical connections or moving the rechargeable UAV. In another example, releasing the rechargeable UAV may include adjusting an adjustable shielding substrate of the power UAV away from the rechargeable UAV to provide more space for the rechargeable UAV to initiate flight.

Figure 5:
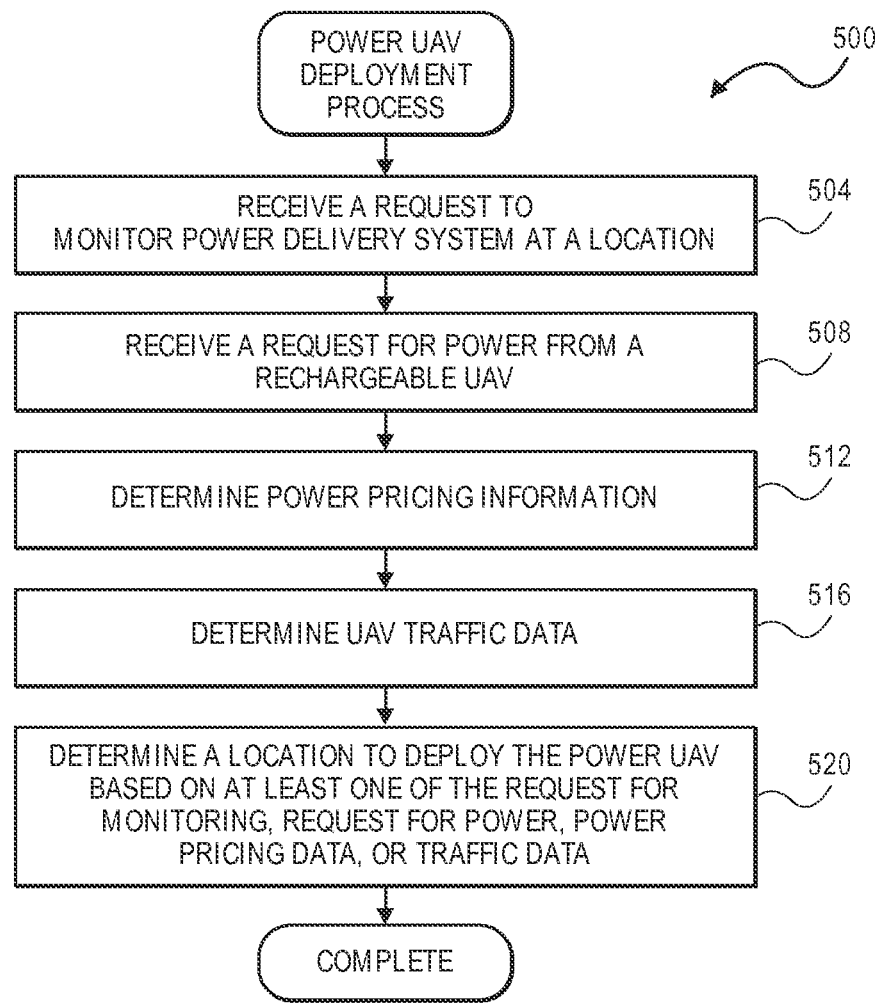
FIG. 5 is a flow diagram illustrating an example process for deploying a power UAV to a location, according to an implementation.

FIG. 5 is a flowchart illustrating an example process 500 for deploying a power UAV, according to an implementation. The example process 500 may be implemented with a power UAV or a remote system of a UAV recharging system, such as the power UAV 110 or the remote system 150 of the UAV power generation system 100 that is discussed above with respect to FIG. 1.

A monitoring request to monitor a characteristic of a conductor or other component of a power delivery system at a location may be received, as in 504. The monitoring request may include GPS coordinates or other location indicator for a location where such monitoring is requested. The monitoring request may be transmitted by the power delivery system to a power UAV or a remote system. The monitoring request may be transmitted based on a periodic inspection plan, or it may be transmitted after a malfunction of the power delivery system has been determined and troubleshooting is desired. Monitoring power delivery system components or conductors with a power UAV is advantageous because power delivery systems often include components located at remote locations that are difficult for humans to reach.

A request for power may be received from one or more rechargeable UAVs, as in 508. For example, the request for power may include a request for a particular recharging service (e.g. recharge with a charging current or recharge by replacing an energy storage device). In another example, the request for power includes a request for an amount of power. For example, a rechargeable UAV may send the request for power if its charge level is below a threshold amount. In another example, the power UAV transmits signals indicative of at least one of pricing for recharging services, available recharging services, or power UAV locations to one or more rechargeable UAV. The rechargeable UAV may transmit a request for power based at least on the signals transmitted by the power UAV. For example, the request for power may include a service or a location indicated as being available by the signals transmitted by the power UAV. The request for power may be received by a remote system or a power UAV.

Power pricing information for drawing power from a conductor may also be determined, as in 512. Power pricing information refers to the amount charged to draw power from a conductor of a power delivery system. Power pricing information may depend on the location, energy demand, time of day, etc. Real-time power pricing information may be determined by querying a database, such as a database of the power delivery system. In another example, power pricing information is periodically transmitted from the power delivery system to the power UAV or a remote system. In another example, power pricing information may be retrieved from a memory of a power UAV.

UAV traffic data may also be determined, as in 516. UAV traffic data indicates locations along the power delivery system where rechargeable UAVs may need recharging services. For example, UAV traffic data may be determined by receiving UAV traffic data from an external source or the power delivery system. In another example, a predictive model is used to identify UAV traffic data. In another example, the UAV power generation system may determine UAV traffic data.

A deployment location for the power UAV may be determined based on at least one of a request for power, UAV traffic data, a request for monitoring, or power pricing information, as in 520. A determined deployment location may be at a high traffic location that is also along the flight path of the rechargeable UAV. In another example, power pricing information may indicate that prices for pricing will increase soon (e.g., in ten minutes). In such an example, the deployment location may be at the closest conductor so the power UAV can recharge its power source before the price increase takes effect.

Figure 6:
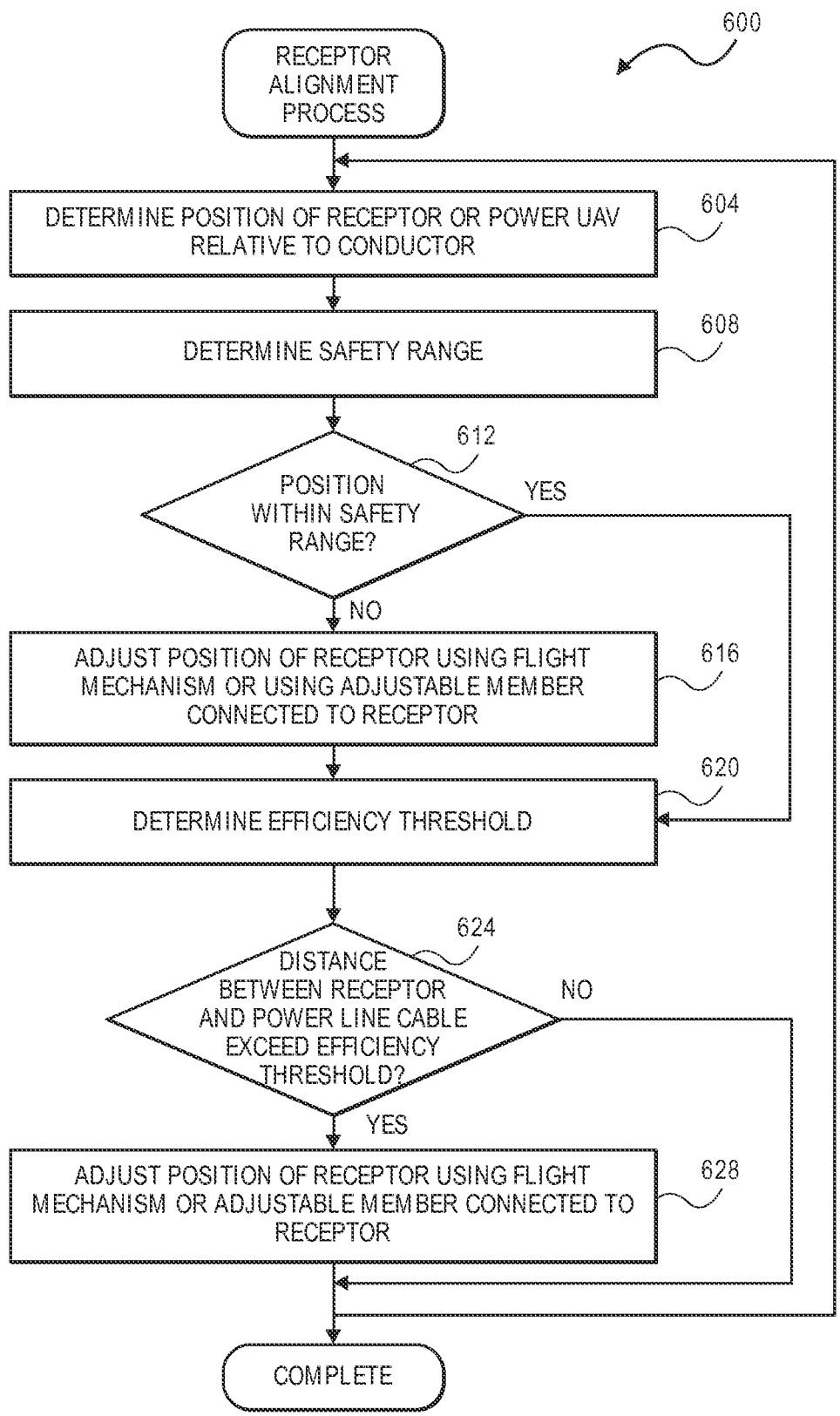
FIG. 6 is a flow diagram illustrating an example process for aligning a receptor of a power UAV with a conductor of an overhead power line, according to an implementation.

FIG. 6 is a flowchart illustrating an example process 600 for aligning a receptor of a power UAV with a conductor of a power delivery system according to an implementation. Example process 600 may be implemented in control electronics of a power UAV, such as power UAV controller 800 discussed herein with respect to FIG. 8.

A position of the receptor or power UAV relative to the conductor may be determined, as in 604. For example, a distance sensor located on the power UAV may output a signal indicative of a distance from the conductor to the receptor. If the receptor is adjustable with respect to the frame of the power UAV, its adjusted position can be factored in. In another example, a distance between the conductor and the receptor may be estimated using at least an expected or measured voltage, current, or frequency value for the AC power signal passing through the conductor and a measured amount of current generated by the receptor. The measured current may indicate the distance between the conductor and the receptor for a known power signal.

A safety range (also referred to herein as a "safety distance") may be determined, as in 608. A safety range may be a minimum distance that the receptor should stay from the conductor to reduce the likelihood of the receptor contacting the conductor. The safety range can be determined and updated periodically. For example, the safety range may be determined based on weather conditions at the location (e.g. the amount of wind), amount of cargo (e.g. number of rechargeable UAVs) carried by the power UAV, type of receptor coupling mechanism (e.g. adjustable or not), whether a takeoff or landing of a rechargeable UAV is expected, etc.

A determination may be made as to whether the determined position of the receptor or the power UAV is within the safety range, as in 612. For example, a value of the determined position may be compared with a value of the determined safety range. If the determined position is not within the safety range then the position of the receptor may be adjusted to move away from the conductor, as in 616. The position of the receptor may be adjusted by initiating flying of the UAV or by adjusting the position of receptor with a receptor adjustment element. For example, the position of the receptor may be adjusted by raising or lowering a cable attached to the receptor, such as the receptor adjustment element 214 discussed above with respect to FIG. 2B, or by using a mechanical device, such as the receptor adjustment element 213 discussed above with respect to FIG. 2A.

After adjusting the position of the receptor or the power UAV, or if it is determined that the receptor or the power are within the safety range, an efficiency threshold (also referred to herein as "efficiency distance") may be determined, as in 620. The efficiency threshold refers to maximum distance for a desired rate of charging to occur. The current that may be generated generally decreases as the receptor is moved away from the conductor. The efficiency threshold may be determined based on at least one of the measured or assumed characteristics for the AC voltage signal or the characteristics of the coil in the receptor. For example, the number of coils, the number of turns in the coil(s), composition of the coil(s) (e.g. permeability of the coil(s)), dimensions (e.g. length or cross-sectional area) of the coil(s), and connections between coils may impact the charging rate for different distances between the receptor and the conductor. In some implementations, the efficiency threshold may be determined based at least in part on the weather at the location because, for example, the magnetic permeability of air may depend on its humidity. In one or more implementations, the efficiency threshold is determined based on a minimum distance to tune the receptor to a resonance frequency with respect to the conductor.

A determination may also be made as to whether the determined position of the receptor or the power UAV exceeds the efficiency threshold, as in 624. For example, a value of the determined position may be compared with a value of the determined efficiency threshold. If the determined position exceeds the efficiency threshold, then the position of the receptor may be adjusted towards the conductor, as in 628. The position of the receptor may be adjusted by initiating flying of the UAV or by adjusting the position of receptor with a receptor adjustment mechanism. For example, the position of the receptor may be adjusted by raising or lowering a cable attached to the receptor, such as the receptor adjustment element 214 discussed above with respect to FIG. 2B, or by using a mechanical device, such as the receptor adjustment element 213 discussed above with respect to FIG. 2A. The orientation of the coil(s) in the receptor with respect to the conductor may also impact the amount of power that may be generated by the receptor. In some implementations, an alignment of the coil(s) of the receptor is determined and the receptor adjustment element adjusts the orientation of the receptor to achieve a desired alignment between the conductor and the receptor.

Figure 7:
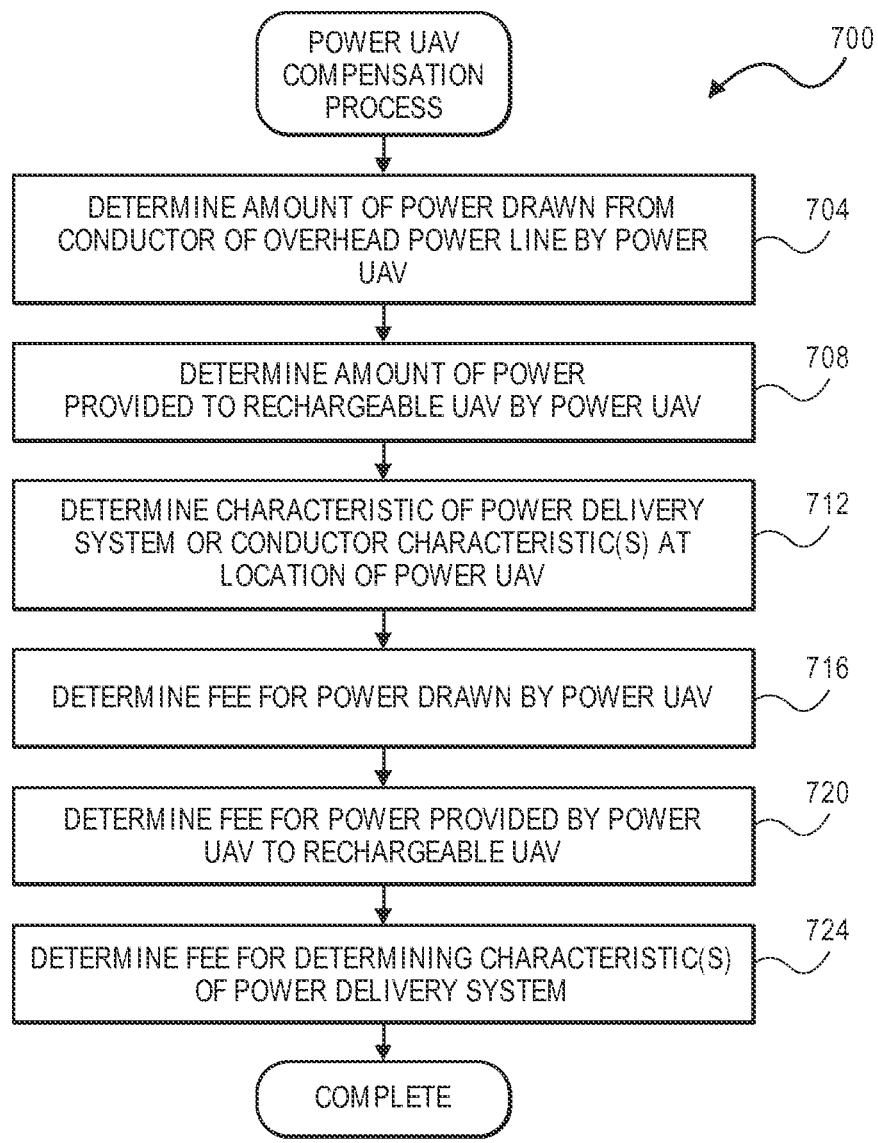
FIG. 7 is a flow diagram illustrating an example process for determining compensation for power drawn by a power UAV from a conductor of an overhead power line, according to an implementation.

FIG. 7 is a flow diagram illustrating an example process 700 for providing compensation, according to an implementation. The example process 700 may be performed, for example, by a UAV power generation system, such as the UAV power generation system 100 discussed above with respect to FIG. 1. The example process 700 provides a mechanism for providing compensation for power drawn from the power delivery system by the power UAV, power provided to rechargeable UAVs, or monitoring of the power delivery system by the power UAV.

The power drawn from the power delivery system by a power UAV may be monitored, as in 704. This monitoring may be accomplished, for example, by monitoring the current/power generated with the receptor. Current/power generated by the receptor may be measured using a current sensor or a power meter device.

The power provided to rechargeable UAVs may be determined, as in 708. For example, a current sensor or power meter may be used to determine an amount of power provided to the rechargeable UAVs by the power UAV, as discussed above. In another example where an energy storage device of the rechargeable UAV is replaced with a charged energy storage device from the power UAV, the power used to charge the energy storage device may be determined or providing the energy storage device may be treated as a fixed fee amount for the energy storage device.

A characteristic of a component of the power delivery system may also be determined, as in 712. For example, the determined characteristic may include a measured voltage value, the measured current value, an image of a portion of a component of the power delivery system, a measured temperature, and a measured electrical or magnetic field, etc. Such a characteristic may be determined based on current generated with the receptor. The current generated by the receptor at a determined distance from the conductor may indicate an overall efficiency of the conductor or the power delivery system at that location. Voltages, currents, magnetic fields, and temperatures may be measured using sensors. For example, an image sensor onboard the power UAV may capture an image that includes a portion of the power delivery system at the location. A sensor may measure the frequency of the AC power signal. The determined characteristic or related data may be stored in a data store of the power UAV or the remote system. This data may be provided to the power delivery system and may be useful for analyzing or troubleshooting the performance of the power delivery system.

A fee for power drawn by the power UAV may be determined, as in box 716. The fee for power drawn by the power UAV may be determined based on, for example, a rate and current generated by the power UAV. Likewise, current provided to rechargeable UAVs and a rate may be used to determine a fee for the power provided to the rechargeable UAVs by the power UAV, as in 720.

A fee for determining characteristics of the power delivery system may be determined, as in 724. The fee for determining the characteristic of the power delivery system may be based on the power characteristics determined by the power UAV, the type or complexity of the measurements, a distance required for a power UAV to travel to the location, whether charging was also performed at the location, etc. In one example, the determined fee for the power drawn by the power UAV is offset or reduced by the determined fee for determining the characteristic(s) of the power delivery system. In another example, in return for determining characteristic(s) of the power delivery system, and providing those characteristics to the power delivery system, the power UAV may receive power credits that allow the power UAV to draw an amount of power from the power delivery system without incurring an additional fee.

Figure 8:
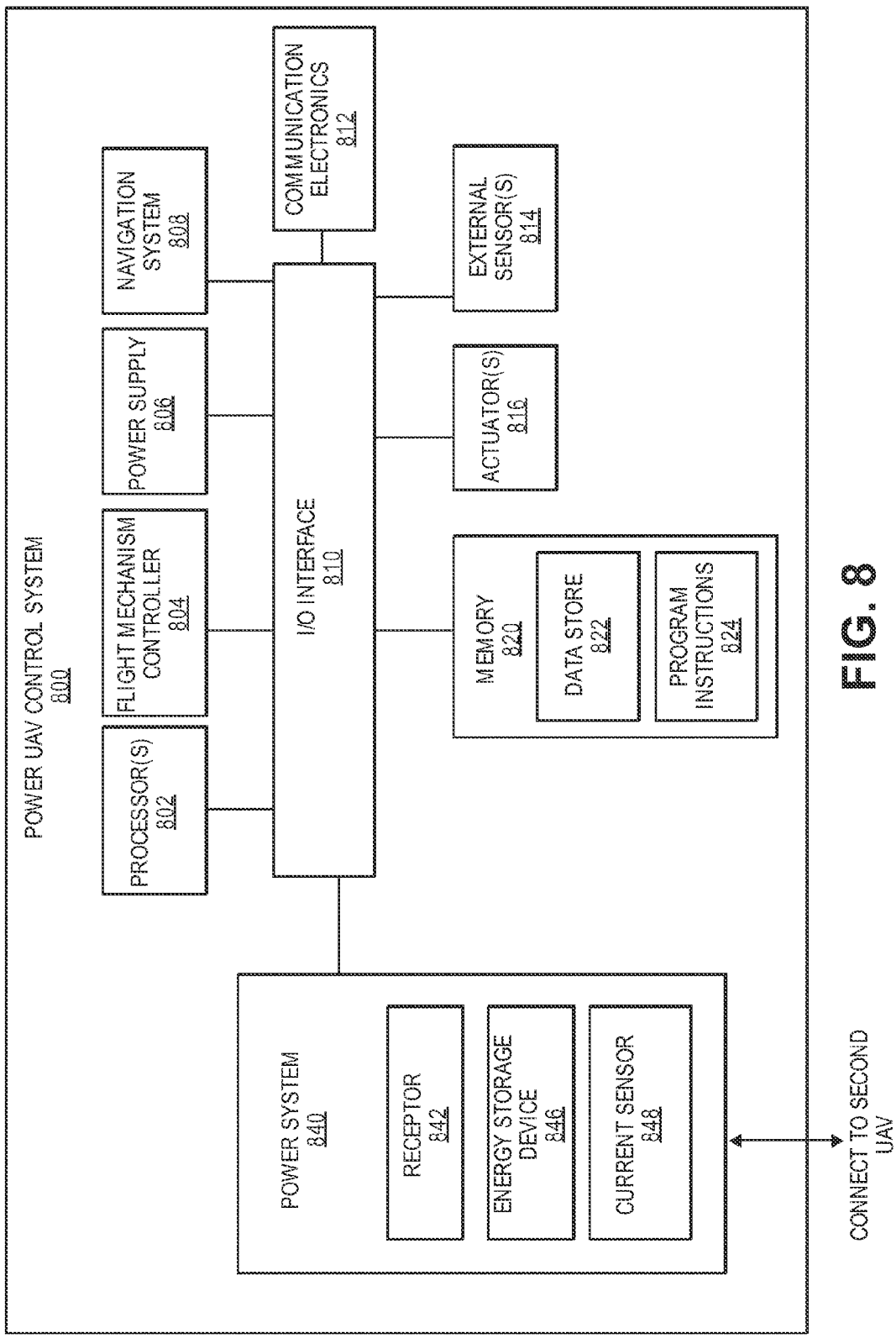
FIG. 8 is a block diagram illustrating various components of a power UAV control system, according to an implementation.

FIG. 8 is a block diagram illustrating an example power UAV control system 800, according to an implementation. In various examples, the block diagram may be illustrative of one or more aspects of the UAV control system 800 that may implement the systems and methods discussed above. For example, UAV control system may be used with the power UAVs 110, 210, and 211 discussed herein with respect to FIGS. 1, 2A, and 2B. In the illustrated implementation, the power UAV control system 800 includes one or more processors 802, coupled to a non-transitory computer readable storage medium 820 via an input/output (I/O) interface 810. The power UAV control system 800 may also include a flight mechanism controller 804, power supply module 806, and/or a navigation system 808. The UAV control system 800 also includes communication electronics 812, external sensors 814, and actuator(s) 816.

In one or more implementations, the power UAV control system 800 may include the functionality discussed above. The power UAV control system 800 may utilize one or more common sensors, memories, data stores, communication components, etc. However, in other implementations, the UAV control system 800 and the functionality discussed above may be embodied in separate systems that utilize some or all of their own components and/or power modules. Separating the functionality discussed above from the power UAV control system 800 may provide additional redundancy and operability if a failure occurs.

In various implementations, the power UAV control system 800 may be a uniprocessor system including one processor 802, or a multiprocessor system including several processors 802 (e.g., two, four, eight, or another suitable number). The processor(s) 802 may be any suitable processor capable of executing instructions. In various implementations, the processor(s) 802 may be general-purpose or embedded processors implementing any of many instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, fee information, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other memory. In the illustrated implementation, program instructions and data implementing desired functions, such as those described above, are shown stored within the non-transitory computer readable storage medium 820 as program instructions 824, or data storage 822. In other implementations, program instructions, data, flight paths, or monitored data may be received, sent, or stored upon different computer-accessible media, such as non-transitory media, or on similar media separate from the non-transitory computer readable storage medium 820 of the power UAV control system 800. A non-transitory, computer readable storage medium may include storage media or memory media, such as magnetic or optical media, e.g., disk or CD/DVD-ROM, coupled to the UAV control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, implemented via a network interface.

In one implementation, the I/O interface 810 may be configured to coordinate I/O traffic between the processor(s) 802, the non-transitory computer readable storage medium 820, and any peripheral devices, or other peripheral interfaces, such as sensors 814. In some implementations, the I/O interface 810 may perform any necessary protocol, timing or other data transformations to convert data signals from one component (e.g. non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The flight mechanism controller 804 communicates with the navigation system 808 and adjusts the power of each flight mechanism to guide the power UAV along a determined flight path. The navigation system 808 may include a GPS or other similar system that can navigate the UAV to and/or from a location.

The power supply module 806 may control the charging and any switching functions associated with one or more power modules (e.g., batteries) of the power UAV. The power supply module 806 may be coupled to a power system 840 that includes a receptor module 842, an energy storage device 846, and a current sensor 848 for use in connection with the methods discussed above. In one or more implementations, the power supply module 806 controls the current generated by the receptor module 842. For example, the power supply module 806 may switch on or off power transfer from the power UAV to a rechargeable UAV.

The communication electronics 812 may be configured to allow data to be exchanged between the power UAV control system 800, other devices attached to a network, such as other computer systems, and/or with UAV control systems of other UAVs. The communication electronics 812 may enable wireless communication between numerous UAVs. In various implementations, the communication electronics 812 support communication via wireless general data networks, such as a Wi-Fi network. The communication electronics 812 may support communication via telecommunications networks, such as cellular communication networks, satellite networks.

External sensors 814 may, in some implementations, include one or more image capture devices, thermal sensors, infrared sensors, time of flight sensors, accelerometers, pressure sensors, weather sensors, airflow sensors, etc. Multiple external sensors 814 may be present and controlled by the power UAV control system 800. One or more of these sensors may assist with monitoring aspects of the power delivery system.

As shown in FIG. 8, the non-transitory computer readable storage medium 820 may include program instructions 824 that may be configured to implement the example processes and/or sub-processes described above. The non-transitory computer readable storage medium 820 may include various data stores 822 for maintaining data items that may be provided for determining flight paths, adjusting the receptor 114, (FIG. 1) landing, etc. Likewise, the power UAV 110 may include other program instructions that may be configured to implement one or more of the example processes and/or sub-processes described above.

In various implementations, the parameter values and other data illustrated as included in one or more data stores may be combined with other information not described or may be partitioned differently into more, fewer, or different data structures. In some implementations, data stores may be physically in a memory or may be distributed among two or more memories.

Those skilled in the art will appreciate that the power UAV control system 800 is merely illustrative and is not intended to limit the present disclosure. The power UAV control system 800 may include any combination of hardware or software that can perform the indicated functions, including computers, network devices, internet appliances, wireless phones, etc. The power UAV control system 800 may also be connected to other devices not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as stored in memory or storage while being used, these items or portions of them may be transferred between memory and other storage devices for memory management and data integrity. In other implementations, some or all of the software components may execute in memory on another device and communicate with the illustrated power UAV control system 800. Some or all of the system components or data structures may also be stored (e.g., as instructions or structured data) on a non-transitory, computer-accessible medium or a portable article to be read by a drive, various examples of which are described above. In some implementations, instructions stored on a computer-accessible medium separate from the power UAV control system 800 may be transmitted to the UAV control system 800 via transmission media or signals, such as electrical, electromagnetic, or digital signals, conveyed via a communication medium such as a wireless link, etc. Various implementations may further include receiving, sending, or storing instructions and/or data implemented under the foregoing description upon a computer-accessible medium. The techniques described may be practiced with other power UAV control system configurations.

We claim:

1. A power unmanned aerial vehicle (UAV), comprising:
a receptor configured to generate a current from a magnetic field emanating from a conductor of an overhead power line; and
a control element configured to at least:
generate a first control signal to cause the power UAV to fly to a location of the conductor such that the receptor is at a first position near the conductor;
determine a position of the receptor of the power UAV with respect to the conductor; and
generate, based at least in part on the determined position, at least one of:
a second control signal to cause a receptor adjustment component to adjust the position of the receptor; or
a third control signal to cause a flight control system to adjust the position of the receptor by adjusting a second position of the power UAV.

2. The power UAV of claim 1, wherein the control element is further configured to at least:
enable a charging current to be provided to a second UAV from the power UAV, wherein the charging current includes at least one of:
at least a portion of the generated current; or
at least a portion of a stored current from an energy storage device of the power UAV.

3. The power UAV of claim 2, wherein the control element is further configured to at least:
prior to causing the charging current to be provided to the second UAV, generating a fourth control signal to fly the power UAV at least a distance away from the conductor.

4. The power UAV of claim 1, further comprising:
a platform configured to receive a second UAV;
wherein the control element is further configured to at least generate the first control signal after the second UAV has been received at the platform.

5. The power UAV of claim 1, further comprising:
a coupling mechanism configured to couple a second UAV to the power UAV such that power may be transferred from the power UAV to the second UAV via the coupling mechanism while the power UAV is flying.

6. The power UAV of claim 1, further comprising:
a shielding substrate, wherein the shielding substrate is adjustable;
wherein the control element is further configured to at least:
generate a fourth control signal to adjust a position of the shielding substrate to shield an electrical component of a second UAV from the magnetic field emanating from the conductor.

7. A power unmanned aerial vehicle ("UAV") control system of a power UAV, the power UAV control system comprising:
a control element configured to at least:
generate a first control signal to cause the power UAV to fly to a location of a conductor of an overhead power line such that a receptor of the power UAV is at a first position near the conductor to generate a current from a magnetic field emanating from the conductor;

determine a position of the receptor of the power UAV with respect to the conductor; and generate, based at least in part on the determined position, a second control signal to adjust the position of the receptor.

8. The power UAV control system of claim 7, wherein the control element is further configured to generate the first control signal based at least in part on:

a request signal from a second UAV;

a time of day data; or a level of charge of an energy storage device of the power UAV.

9. The power UAV control system of claim 7, wherein the control element is further configured to determine a safety distance based at least in part on:

weather data; or a load state of the power UAV, wherein the load state is based at least in part on a present cargo load of the power UAV or an expected cargo load of the power UAV at a future time.

10. The power UAV control system of claim 9, wherein:

the second control signal is generated based at least in part on the safety distance; and the second control signal causes the receptor of the power UAV to move away from the conductor.

11. The power UAV control system of claim 7, wherein the control element is further configured to determine an efficiency distance based at least in part on:

an amount of current generated by the receptor; or a magnitude of the magnetic field emanating from the conductor.

12. The power UAV control system of claim 11, wherein:

the second control signal is generated based at least in part on the efficiency distance; and the second control signal causes the receptor to move towards the conductor.

13. The power UAV control system of claim 7, wherein the control element is further configured to at least:

cause a charging current to be provided to a second UAV from the power UAV, wherein the charging current includes at least one of:

at least a portion of the generated current; or at least a portion of a stored current from an energy storage device of the power UAV.

14. The power UAV control system of claim 13, wherein the control element is further configured to at least:

prior to causing the charging current to be provided to the second UAV, generating a third control signal to cause the power UAV to fly at least a distance away from the conductor.

15. The power UAV control system of claim 7, wherein the control element is further configured to generate the first control signal in response to a second UAV being received at a platform of the power UAV.

16. A method to control a power unmanned aerial vehicle (UAV), comprising:

flying the power UAV to a location of a conductor of an overhead power line such that a receptor of the power UAV is at a first position near the conductor;

generating a current from a magnetic field emanating from the conductor while the power UAV is flying;

determining a position of the receptor of the power UAV with respect to the conductor; and adjusting the position of the receptor based on at least the determined position.

17. The method of claim 16, further comprising:

flying the power UAV at least a distance away from the conductor;

receiving at the power UAV, and after flying the power UAV at least a distance away from the conductor, a second UAV; and providing a current from the power UAV to a second UAV.

18. The method of claim 16, further comprising determining the location based at least in part on at least one of:

a request signal from a second UAV;

a time of day data; or a level of charge of an energy storage device of the power UAV.

19. The method of claim 16, further comprising:

determining a safety distance between the receptor and the conductor that is to be maintained based at least in part on:

weather data; or a load state of the power UAV, wherein the load state is based at least in part on a current cargo load of the power UAV or an expected cargo load of the power UAV at a future time; and adjusting the position of the receptor away from the conductor.

20. The method of claim 16, further comprising:

flying the power UAV to the location after receiving a second UAV by the power UAV.

* * * * *